(12) United States Patent
Buse et al.

(10) Patent No.: US 11,279,542 B2
(45) Date of Patent: Mar. 22, 2022

(54) CIGARETTE PACKAGE (71) Applicant: Focke & Co. (GmbH & Co. KG), Verden (DE)

(72) Inventors: Henry Buse, Visselhövede (DE); Hans Schönberger, Verden (DE); Michael Schlenker, Verden (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

(21) Appl. No.: 16/792,457

(22) Filed: Feb. 17, 2020

(65) Prior Publication Data
US 2020/0180853 A1 Jun. 11, 2020

Related U.S. Application Data (62) Division of application No. 15/328,345, filed as application No. PCT/EP2015/001429 on Jul. 13, 2015, now Pat. No. 10,633,169.

(30) Foreign Application Priority Data

Aug. 6, 2014 (DE) .......................... 102014011396.5

(51) Int. Cl.
*B65D 85/10* (2006.01)
*B65D 77/02* (2006.01)
(Continued)

(52) U.S. Cl.
CPC ............. *B65D 77/02* (2013.01); *B65D 77/32* (2013.01); *B65D 77/38* (2013.01); *B65D 85/1048* (2020.05); *B65D 85/10568* (2020.05)

(58) Field of Classification Search
CPC ........ B65D 77/02; B65D 77/32; B65D 77/38; B65D 85/1045; B65D 80/1048; B65D 85/10568
(Continued)

(56) References Cited

U.S. PATENT DOCUMENTS 2,992,766 A * 7/1961 Guyer ................... B65D 5/543
229/160.1
4,196,842 A 4/1980 Focke
(Continued)

FOREIGN PATENT DOCUMENTS

CN 101668691 A 3/2010
CN 102245481 A 11/2011
(Continued)

OTHER PUBLICATIONS

Patent Translate powered by EPO and Google for JP2001171768A (6 pages of description).*
(Continued)

*Primary Examiner* — Luan K Bui
(74) *Attorney, Agent, or Firm* — Laurence P. Colton; Smith Tempel Blaha LLC (57) ABSTRACT

A cigarette pack with an outer pack in the embodiment as a hinge lid box and with an inner pack as a sealed block is provided with an opening tab for the inner pack and with a closure label for actuating the opening tab. The closure label is fixed on the inner side of a lid front wall by means of an actuating tab and is movable with the lid into the opening position. Pressure members cause the closure label to be pressed with regions of glue onto the inner side of the lid front wall.

2 Claims, 11 Drawing Sheets

(51) Int. Cl.
    *B65D 77/32*     (2006.01)
    *B65D 77/38*     (2006.01)

(58) Field of Classification Search
    USPC ............... 206/242, 245, 265, 268, 271, 273; 229/87.14, 160.1
    See application file for complete search history.

(56) References Cited

U.S. PATENT DOCUMENTS

| | | | |
|---|---|---|---|
| 4,267,958 A * | 5/1981 | Focke | B65D 5/6691 229/146 |
| 4,300,676 A | 11/1981 | Focke | |
| 4,392,338 A | 7/1983 | Fox | |
| 4,466,536 A | 8/1984 | Zeitel | |
| 5,207,322 A * | 5/1993 | Focke | B65D 5/6691 206/268 |
| 5,314,062 A * | 5/1994 | Wu | B65D 5/6611 206/268 |
| 5,439,105 A * | 8/1995 | Focke | B65D 5/48048 206/268 |
| 6,742,652 B1 | 6/2004 | Focke | |
| 2004/0144661 A1* | 7/2004 | Lutzig | B65D 5/6691 206/268 |
| 2007/0108074 A1 | 5/2007 | Buse | |
| 2010/0230303 A1* | 9/2010 | Buse | B65D 5/66 206/268 |
| 2010/0252462 A1 | 10/2010 | Marchetti et al. | |
| 2011/0005948 A1* | 1/2011 | Buse | B65D 85/1048 206/268 |
| 2011/0303567 A1 | 12/2011 | Bray | |
| 2015/0027916 A1 | 1/2015 | Buse | |

FOREIGN PATENT DOCUMENTS

| | | |
|---|---|---|
| CN | 103958369 A | 7/2014 |
| DE | 1142545 B | 1/1963 |
| DE | 2710163 A1 | 9/1977 |
| DE | 2854443 A1 | 7/1980 |
| DE | 102009034705 A1 | 1/2011 |
| DE | 102011008666 A1 | 7/2012 |
| DE | 102011119344 A1 | 4/2013 |
| EP | 2141090 A1 | 1/2010 |
| EP | 2366637 A1 | 9/2011 |
| EP | 2455302 A1 | 5/2012 |
| EP | 2155568 B1 | 7/2012 |
| GB | 2498732 A | 7/2013 |
| JP | H05112350 A | 5/1993 |
| JP | 2001171768 A | 6/2001 |
| JP | 2001301745 A | 10/2001 |
| JP | 2002537190 A | 11/2002 |
| JP | 2003507268 A | 2/2003 |
| JP | 2003507269 A | 2/2003 |
| JP | H05054247 U | 3/2005 |
| JP | 2009292571 A | 12/2009 |
| JP | 2011513148 A | 4/2011 |
| JP | 2012511478 A | 5/2012 |
| JP | 2013536129 A | 9/2013 |
| JP | 2014514992 A | 6/2014 |
| JP | 2014531373 A | 11/2014 |
| WO | 2000005151 A1 | 2/2000 |
| WO | 200048929 A1 | 8/2000 |
| WO | 2008142540 A1 | 11/2008 |
| WO | 2010001334 A1 | 1/2010 |
| WO | 2010066543 A1 | 6/2010 |
| WO | 2011157332 A | 12/2011 |
| WO | 2012095135 A1 | 7/2012 |
| WO | 2012147073 A | 11/2012 |
| WO | 2012147073 A1 | 11/2012 |
| WO | 2013046444 A1 | 4/2013 |
| WO | 2013053408 A1 | 4/2013 |
| WO | 2013084642 A1 | 6/2013 |
| WO | 2013120913 A1 | 8/2013 |
| WO | 2013120915 A1 | 8/2013 |
| WO | 2013120916 A1 | 8/2013 |
| WO | 2014013478 A1 | 1/2014 |
| WO | 2014082717 S1 | 6/2014 |
| WO | 2014097064 A1 | 6/2014 |

OTHER PUBLICATIONS

Japan Patent Office, Office Action (in a related case and translated into German), dated Nov. 23, 2020.
Deutsches Patent—und Markenamt, Recherchebericht (search in a related application), Apr. 10, 2015.
WIPO, International Search Report (on parent international application), Nov. 19, 2015.
European Patent Office, Europaischer Teilrecherchenbericht (search in connection with a related application), Oct. 27, 2017.
European Patent Office, Europaischer Recherchebericht (search in connection with a related application), Jan. 29, 2018.
State Intellectual Property Office of the People's Republic of China, Notification of the First Office Action (on a related application), Jun. 5, 2018.
Japan Patent Office, Office Action (translated into German, on a related application), Apr. 24, 2019.
European Patent Office, Notice of Opposition to a European Patent (filed against a related application), Jun. 12, 2019.

\* cited by examiner

CIGARETTE PACKAGE

STATEMENT OF RELATED APPLICATIONS

This application is a divisional of U.S. patent application Ser. No. 15/328,345 having a filing date of 23 Jan. 2017, which is the US National Phase of International Application No. PCT/EP2015/001429 having an International Filing Date of 13 Jul. 2015, which claims priority on German Patent Application No. 10 2014 011396.5 having a filing date of 6 Aug. 2014.

BACKGROUND OF THE INVENTION

Technical Field

The invention relates to packs, in particular for cigarette groups, in particular for a cigarette group, consisting of an inner pack produced from film, preferably sealing film, and of an outer pack with a lid, in particular hinge lid pack, wherein the inner pack has a removal opening with a closure label which is preferably repeatedly usable and is fixed on the inner pack with a permanently acting adhesive and extends preferably in the region of an inner end wall and at least one adjacent region of an inner front wall, wherein a free end region of the closure label has a gripping tab or actuating tab which is permanently connected to the inner side of the lid—lid front wall—in such a manner that, when the lid is actuated, the closure label is pulled by the lid into an opening position or into a closure position.

The invention also relates to packs, in particular for a cigarette group, consisting of an inner pack produced from film—inner blank—preferably sealing film, and of an outer pack produced from a stiffer packing material, in particular cardboard, with a lid, in particular in the embodiment of a hinge lid pack, wherein the inner pack has a removal opening which—originally—extends through an opening tab, preferably in the region of an inner end wall and in an end-side, adjoining region of an inner front wall and which is bounded by a line of weakness in the film of the inner pack.

The invention also relates to packs, in particular for a cigarette group, consisting of an inner pack produced from film, with a removal opening which is closed by a closure label, which is preferably usable repeatedly, with a gripping or actuating tab, and with an outer pack in the embodiment as a hinge lid pack, consisting of a box part, lid with a lid inner flap folded against the inner side of a lid front wall and with a collar, which is preferably formed from a separate blank, with a collar front wall and collar side flaps, wherein the collar front wall forms a recess which is open toward the lid or toward an inner end wall of the inner pack and in the region of which the closure label is arranged with at least one limb—front limb—lying against an inner front wall of the inner pack.

The invention also relates to packs, in particular for a cigarette group, consisting of an inner pack with an inner blank for wrapping the cigarette group and with an outer pack in the embodiment as a hinge lid pack, consisting of a box part, lid with a lid inner flap folded against the inner side of a lid front wall, and a collar, which is preferably formed on a separate blank, with collar front wall and collar side flaps, wherein the collar front wall forms a recess which is open toward the lid or toward an inner end wall of the inner pack and in the region of which a closure label for opening and closing a removal opening of the inner pack is preferably arranged.

Prior Art

Cigarette packs with an inner wrapper produced from an in particular moisture- and aroma-tight film are known in various embodiments, wherein cigarette group and inner wrapper form a (sealed) block.

The cigarette block or sealed block can be provided with a special, repeatedly usable opening aid, in particular in the embodiment with an adhesively bonding closure label for an opening which can be brought again into the closed position by the user after removal of pack contents.

The closure label can be actuated by hand, in particular by means of a gripping tab. Cigarette packs are known in which the closure label of the inner pack is permanently fastened with an end piece on the inner side of the lid of a hinge lid pack as outer pack such that, when the lid is actuated, the closure label is moved into the opening or closed position (EP 2 155 568 B1).

BRIEF SUMMARY OF THE INVENTION

The invention is concerned with improvements to packs of the above or similar design. These are firstly measures for the reliable production of an (adhesively bonding) connection of the closure label to the lid of the (outer) pack. Secondly, these involve the design of the pack to facilitate a precise and reliable attachment of the closure means or closure label to the block-shaped inner pack, and also an optimum appearance of the pack.

To achieve the above object, the pack is a pack formed with any of the following features.

A pack, in particular for a cigarette group, consisting of an inner pack produced from film, preferably sealing film, and of an outer pack with a lid, in particular hinge lid pack, wherein the inner pack has a removal opening with a closure label which is preferably repeatedly usable and is fixed on the inner pack with a permanently acting adhesive and extends preferably in the region of an inner end wall and at least one adjacent region of an inner front wall, wherein a free end region of the closure label has a gripping tab or actuating tab which is permanently connected to the inner side of the lid—lid front wall—in such a manner that, when the lid is actuated, the closure label is pulled by the lid into an opening position or into a closure position, characterized in that projections are formed in the region of the connection of the closure label or of the actuating tab to the inner side of the lid, which connection is preferably produced by adhesive bonding or by sealing, said projections exerting pressure on the closure label or the actuating tab during the closing of the outer pack or during the folding of the lid, in particular during the production of the outer pack and/or during the use thereof, in such a manner that said closure label and actuating tab are pressed with a connecting region onto the associated wall of the pack—lid front wall or lid inner flap.

A pack, in particular for a cigarette group, consisting of an inner pack produced from film, preferably sealing film, and of an outer pack with a lid, in particular hinge lid pack, wherein the inner pack has a removal opening with a closure label which is preferably repeatedly usable and is fixed on the inner pack with a permanently acting adhesive and extends preferably in the region of an inner end wall and at least one adjacent region of an inner front wall, wherein a free end region of the closure label has a gripping tab or actuating tab which is permanently connected to the inner side of the lid—lid front wall—in such a manner that, when the lid is actuated, the closure label is pulled by the lid into an opening position or into a closure position, characterized by a compensating piece or connecting piece produced from thick-walled material, in particular from cardboard, on the inner side of the outer pack or on the inner front wall in the region of the actuating tab which is connected (by adhesive bonding) to the compensating or connecting piece, wherein the connecting piece is connected, preferably on the free outer side, to the inner side of the lid front wall or to the lid inner flap in such a manner that, during the opening of the lid, the closure label or the actuating tab thereof with the connecting piece can be grasped and can be moved by the lid with the closure label into the opening position.

A pack, in particular for a cigarette group, consisting of an inner pack produced from film—inner blank—preferably sealing film, and of an outer pack produced from a stiffer packing material, in particular cardboard, with a lid, in particular in the embodiment of a hinge lid pack, wherein the inner pack has a removal opening which—originally—extends through an opening tab, preferably in the region of an inner end wall and in an end-side, adjoining region of an inner front wall and which is bounded by a line of weakness in the film of the inner pack, characterized in that the opening tab is connected directly to the outer pack, in particular to the lid thereof, preferably to the inner side of a lid front wall, in such a manner that during the opening of the lid of the outer pack (for the first time), the opening tab can be detached from the assembly of the inner pack, with a removal opening of the inner pack being formed, wherein the opening tab in the region of the pack front side or the lid front wall preferably has an end region designed as a tongue, wherein the end region of the opening tab, in particular the tongue, is connected—by adhesive bonding—to the inner side of the lid front wall, preferably by arrangement of a glue strip on the outer side of the opening tab or of the tongue.

A pack, in particular for a cigarette group, consisting of an inner pack produced from film, with a removal opening which is closed by a closure label, which is preferably usable repeatedly, with a gripping or actuating tab, and with an outer pack in the embodiment as a hinge lid pack, consisting of a box part, lid with a lid inner flap folded against the inner side of a lid front wall and with a collar, which is preferably formed from a separate blank, with a collar front wall and collar side flaps, wherein the collar front wall forms a recess which is open toward the lid or toward an inner end wall of the inner pack and in the region of which the closure label is arranged with at least one limb—front limb—lying against an inner front wall of the inner pack, characterized in that the recess extends over the full width of the collar front wall in such a manner that the recess is bounded laterally by the collar side flaps.

A pack, in particular for a cigarette group, consisting of an inner pack with an inner blank for wrapping the cigarette group and with an outer pack in the embodiment as a hinge lid pack, consisting of a box part, lid with a lid inner flap folded against the inner side of a lid front wall, and a collar, which is preferably formed on a separate blank, with collar front wall and collar side flaps, wherein the collar front wall forms a recess which is open toward the lid or toward an inner end wall of the inner pack and in the region of which a closure label for opening and closing a removal opening of the inner pack is preferably arranged, characterized in that the recess of the collar front wall and the lid inner flap are coordinated with each other in respect of size and/or (geometrical) shape and/or positioning or position in such a manner that the lid inner flap preferably lies completely within the recess when the lid is closed.

In a preferred embodiment of the pack, for the automatic production of the connection between closure label and outer pack or lid, projections or pressure pieces are attached in a targeted manner to the pack and, during the manufacturing of the pack and/or during the use of same, reliably produce the (adhesively bonding) connection on account of producing a local press-on pressure in the region of an actuating tab of the closure label, on the one hand, and of the connecting point on the inner side of the lid front wall, on the other hand.

In the case of a (cigarette) pack with a supporting member—inner collar or inner tray—within the inner pack, the supporting member or the inner collar is provided with at least one outwardly directed elevation or thickened portion in the region of the production of the connection of the closure label to the outer pack. The elevation is preferably designed as a projection arising by embossing of the material. Additionally or alternatively, the outer pack is preferably provided with a thickened portion or with a (bead-like) projection, likewise produced by embossing, in the region of the lid front wall, in particular on the inner side of a lid inner flap. The inner and outer projections are preferably arranged in such a manner that they interact during the production of the connection between closure label and lid. Alternatively or additionally, the elevations or projections can also be attached to a collar front wall of a correspondingly designed collar of a hinge lid box as outer pack.

In another embodiment of the invention, a (locally increased) pressure between lid wall (lid front wall) and closure label is produced by a material piece or compensating piece which is arranged in an easily releasable manner on the inner pack or—preferably—in the region of a collar of a hinge lid box (hinge lid pack) designed substantially as standard. The compensating piece is preferably (originally) part of the collar and is releasably connected thereto, in particular by means of punched portions or residual connections. During the production of the (outer) pack, namely during the folding or closing of the lid, the required contact pressure arises in the region of the connection between closure label and lid. During opening of the lid (for the first time), the compensating piece is severed from the collar and moved with the closure label into the opening position. The compensating piece remains permanently connected to the edge region of the closure label.

In a particular embodiment of an (outer) pack of the hinge lid box type, a cigarette block, in particular sealed block, is arranged, preferably without a collar, in the outer pack. The sealed block has an opening tab which is formed from the material or the wall of the sealed block by means of lines of weakness (perforation) and which is detached from the assembly with the inner wrapper when the lid is first opened, preferably because of the connection of an end piece or a tongue of the opening tab to the inner side of the lid front wall.

In order to ensure that opening or closure labels, even of large design, are precisely attached or positioned on the inner pack, in the case of a hinge lid box with a customary collar as the outer pack, the collar is designed in a particular manner. A recess customary in the region of the collar front wall is designed such that it extends (approximately) over the full width of the collar front wall and preferably extends—in height—as far as a front-side, upper edge of a box front wall (closing edge for the lid). The recess is bounded laterally by collar side flaps. The front side of the inner pack, namely the inner front wall, is thereby exposed over the full width, and therefore the attachment and also the handling of the closure label are facilitated.

Another special characteristic of (cigarette) packs of the hinge lid box type in general and in particular with a repeatedly closable sealed block as the inner pack consists in aligning a lid inner flap customary in the case of this type of pack with a hinge lid box collar, which preferably consists of a separate blank, in respect of the position, the shape and the size in such a manner that, when the lid is closed, the lid inner flap is predominantly or preferably completely arranged within the recess formed in the region of the collar front wall. When the lid is closed, the collar front wall and the preferably particularly designed lid inner flap (approximately) lie in a common plane. The recess of the collar front wall is preferably designed in such a manner that, when the lid is closed, an opening or a window is formed in the region of a box front wall of the box part—below a closing edge formed by the lid front wall—preferably approximately in the width or length of the size of the lid inner flap.

BRIEF DESCRIPTION OF THE DRAWINGS

Further details and features of the innovation emerge from the description of the exemplary embodiments illustrated in the patent drawings, in which.

DETAILED DESCRIPTION OF PREFERRED EMBODIMENTS

The cigarette packs illustrated relate to a particular interaction between an outer pack 10, in particular in the embodiment of a hinge lid box or hinge lid pack, and an inner pack 11. The latter consists of a film blank, in particular in the embodiment as a (thermally sealable) multi-layered sealing film. The inner pack 11 or the film blank surrounds a cigarette group 12, forming an inner front wall 13, inner rear wall 14, inner side walls 15 and inner end wall 16. An inner bottom wall which is likewise present is not shown.

Figure 1:
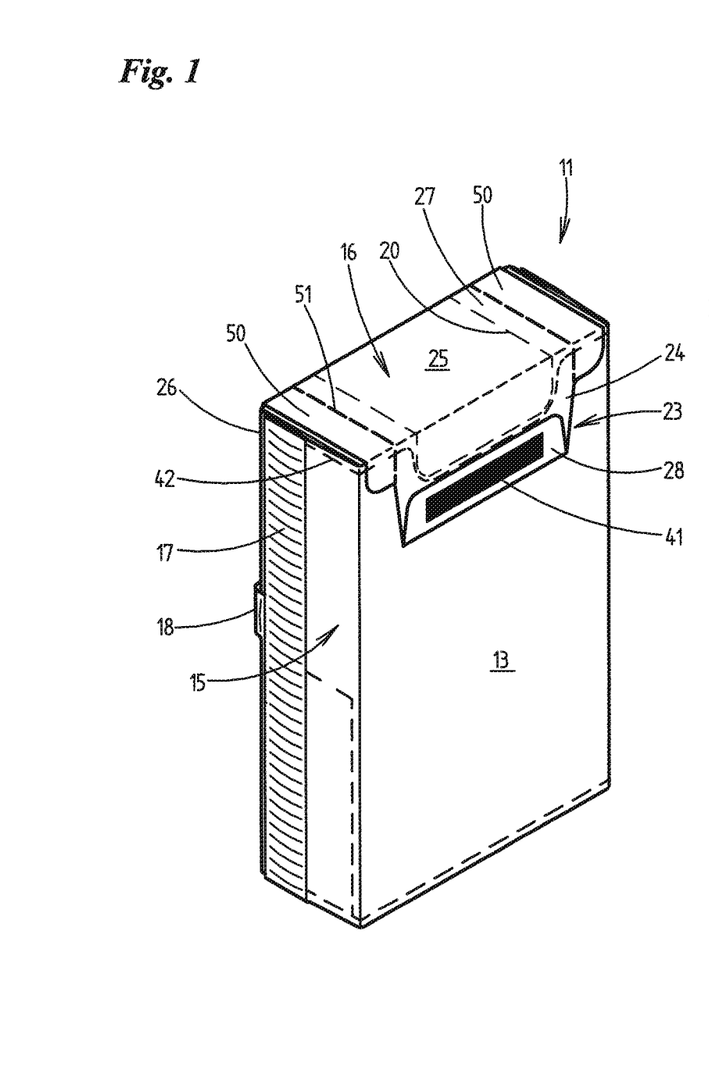
FIG. 1 shows an inner pack or a sealed block with a closure label in a perspective view.

The inner pack 11 surrounding the cigarette group 12 on all sides has connecting or closure seams produced by thermal sealing. In the exemplary embodiment according to FIG. 1 or according to FIG. 5, side seams 17 are formed in the region of the inner side walls 15, specifically in the embodiment as a fin seam. Furthermore, a transverse seam 18 is formed in the region of the inner rear wall 14, likewise in the embodiment as a fin seam. The transverse seam 18 extends approximately to half the height of the inner rear wall 14. In the case of the pack according to FIG. 8 to FIG. 10, the inner pack 11 is provided with a folding arrangement, which is known and customary in the case of silver paper or soft packs, in the region of the inner side walls 15, namely with an envelope folding arrangement 19, forming trapezoidal folding flaps. The latter are likewise connected to one another by thermal sealing (or by adhesive bonding). A corresponding folding arrangement is located in the region of the inner bottom wall (not shown).

The inner pack 11 is provided with a basically known opening aid. A line of weakness, in particular a perforation line 20, forms or bounds an opening tab 21 which extends transversely over the inner end wall 16 and in an upper region of the inner front wall 13. In the opening position, the opening tab 21 opens up a removal opening 22 of the inner pack 11 for the removal of cigarettes.

Figure 2:
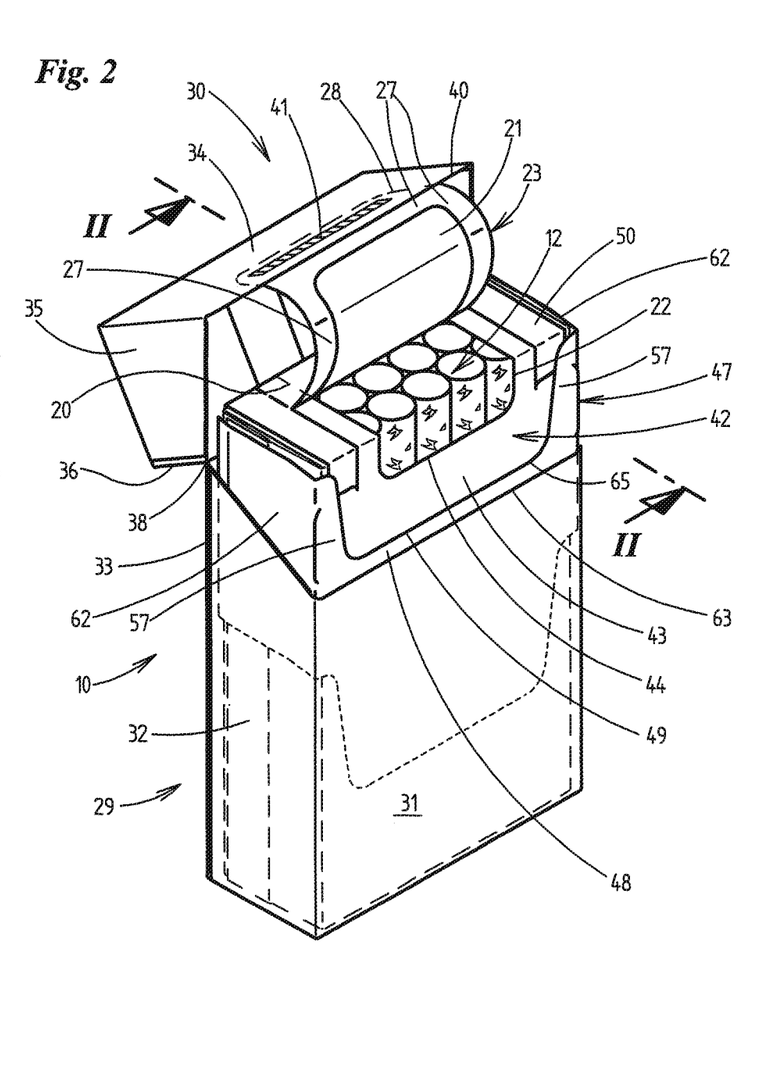
FIG. 2 shows a complete (cigarette) pack in the embodiment as a hinge lid box with an open lid, likewise in a perspective illustration.
Figure 3:
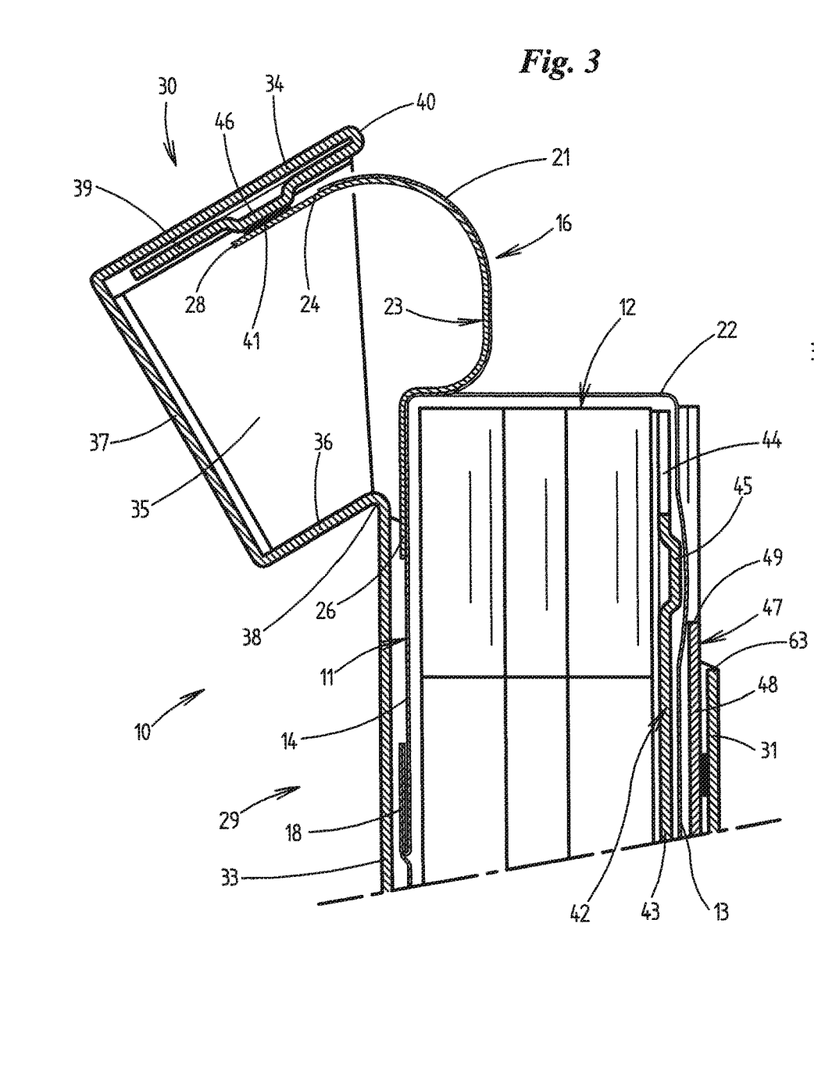
FIG. 3 shows a vertical section of an upper region of the pack according to FIG. 2, on an enlarged scale.
Figure 4:
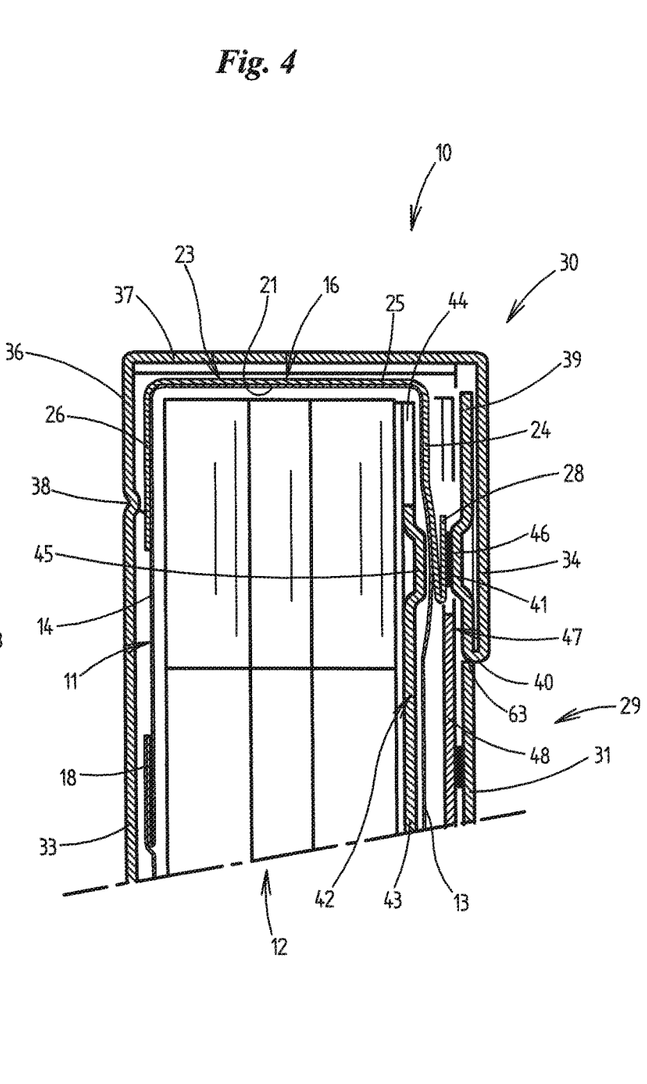
FIG. 4 shows an illustration analogous to FIG. 3 with the lid of the outer pack closed.
Figure 6:
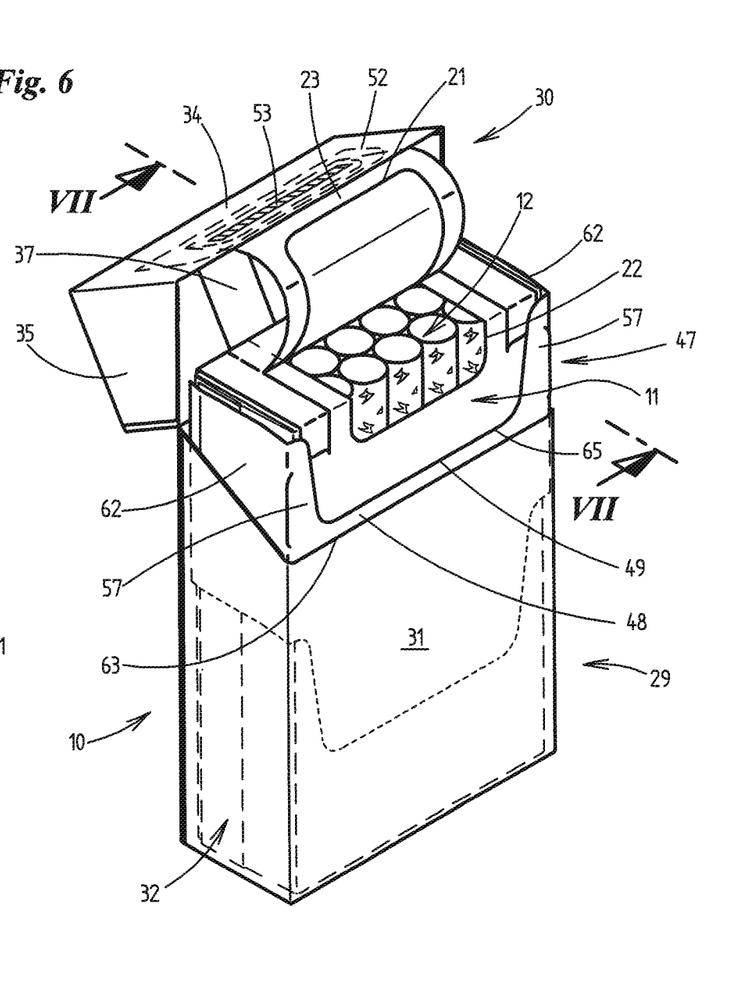
FIG. 6 shows a (cigarette) pack analogous to FIG. 2 with a sealed block of FIG. 5.

The handling means for the repeatedly usable opening aid consists of a closure label 23. The latter is arranged as a film blank with an adhesive bond preferably over the full surface area in an upper, end-side region of the inner pack 11, in the present case with a front limb 24 in the region of the inner front wall 13, an end portion 25 in the region of the inner end wall 16 and an anchoring limb 26 on the inner rear wall 14. The closure label 23 overlaps the opening tab 21 and is adhesively bonded thereto preferably over the full surface area. An edge strip 27 of the closure label 23 is (releasably) adhesively bonded to regions of the inner pack 11 next to the closure label 23. In order to open the inner pack 11, the closure label 23 is grasped on an end region of the front limb 24—actuating tab 28—and moved, carrying along the closure label 23, into the opening position (FIG. 2, FIG. 6).

The actuation of the closure label 23 is coupled, according to FIG. 1 to FIG. 10, to the opening and closing operation of the outer pack 10. The latter, in the embodiment is a hinge lid box, consists of a box part 29 and a lid 30. The box part 29 has a box front wall 31, box side walls 32 and a box rear wall 33. The lid 30 is formed in an analogous manner with lid front wall 34, lid side walls 35 and lid rear wall 36. The upper end is a lid front wall 37. The lid rear wall 36 is pivotably connected to the box rear wall 33 via a transversely directed linear joint 38. In the examples shown, the lid front wall 34 is of double-walled design, namely is provided with a lid inner flap 39 which is folded against the inner side of the lid front wall 34 and is connected thereto (by adhesive bonding), with a lid edge 40 being formed.

The closure label 23 is connected to the lid 30 in such a manner that, when said lid is opened, the closure label 23 is likewise pulled—carrying along the opening tab 21—into the opening position. For this purpose, the closure label 23 is connected (permanently and with sufficient durability) to the inner side of the lid front wall 34, in particular to the inner side of the lid inner flap 39. The actuating tab 28 is preferably provided with spot-shaped or strip-shaped regions of glue which bring about a durable connection between closure label 23 and lid 30.

Measures are provided which, in particular during the production of the pack or during the positioning of the lid front wall 34 in the closure position according to the pack, produce a local contact pressure for producing the (glue) connection between closure label 23 or actuating tab 28 and lid front wall 34, preferably with the lid inner flap 39.

In the exemplary embodiment according to FIG. 1 to FIG. 5, interacting pack parts are provided with projections, thickened portions, elevations or the like which locally produce an increased pressure when the lid 30 is closed, in order to bring about the (adhesive) connection. In the exemplary embodiment, the inner pack 11 is provided with an inner collar 42. The latter is preferably composed of (thin) cardboard and is, for example, of tray-like design with a tray front wall 43, side flaps or side walls, bottom wall and optionally rear wall. For the sake of simplicity, only the tray front wall 43 is shown in the drawings—within the sealed pack 11. The front wall 43 preferably extends over the full height of the inner pack 11. Furthermore, a recess 44 is formed in an inner region in a manner corresponding to the customary recess of a standard collar of a hinge lid box.

A first, outwardly directed elevation or a local projection 45 is provided on the inner collar 42, specifically in the region of the tray front wall 43. The projection 45 which is designed as a bead-like embossing is located in an upper region of the front wall 43, directly below the recess 44, specifically at the height of the connection of the actuating tab 28 to the lid 30 or to the lid inner flap 39. In this exemplary embodiment, the actuating tab 28 is folded over, and therefore an inner side of the closure label 23 is directed outward. The region of glue 41 is accordingly located on the outer side because of the folding arrangement of the actuating tab 28 and is pressed against the lid inner flap 39 when the lid 30 is closed or when the lid front wall 34 is folded.

The outer pack 10 is preferably provided with a mating pressure part. The lid front wall 34 has a mating projection 46 on the inner side. Said mating projection is preferably located level with the projection 45 and increases the contact pressure acting (on both sides) on the connecting point of the closure label 23. The actuating tab 28 is connected to the lid front wall 34 in the region of the mating projection 46 by means of the region of glue 41. A further special characteristic consists in that the mating projection 46, which is preferably produced by embossing, is formed in the region of the lid inner flap 39, and therefore an inwardly offset connecting point for the actuating tab 28 to the lid front wall 34 is created.

The outer pack 10 is designed as a (standard) hinge lid box, specifically with a customary collar 37 with a collar front wall 48 and collar side flap 62. In this type of pack, the collar front wall 48 has a customary end-side recess 49 which facilitates the access to the pack contents. The fastening of the actuating tab 28 is preferably located in the region of this recess 49, as are the projections 45, 46. The closure label 23 is preferably designed in such a manner that strip-shaped expanded portions are formed laterally, namely retaining strips 50. The latter extend in the region of the inner end wall 16, preferably in such a manner that the entire surface of the inner end wall 16 is covered by the closure label 23. Short limbs run into the inner front wall 13 and—not illustrated—into the inner rear wall 14. The retaining strips 50 are delimited from a central main part of the closure label 23 by lines of weakness or perforation lines 51 and are severed from said main part during the opening for the first time, i.e. remain in permanent adhesive connection with the inner pack 11 (FIG. 2).

Figure 5:
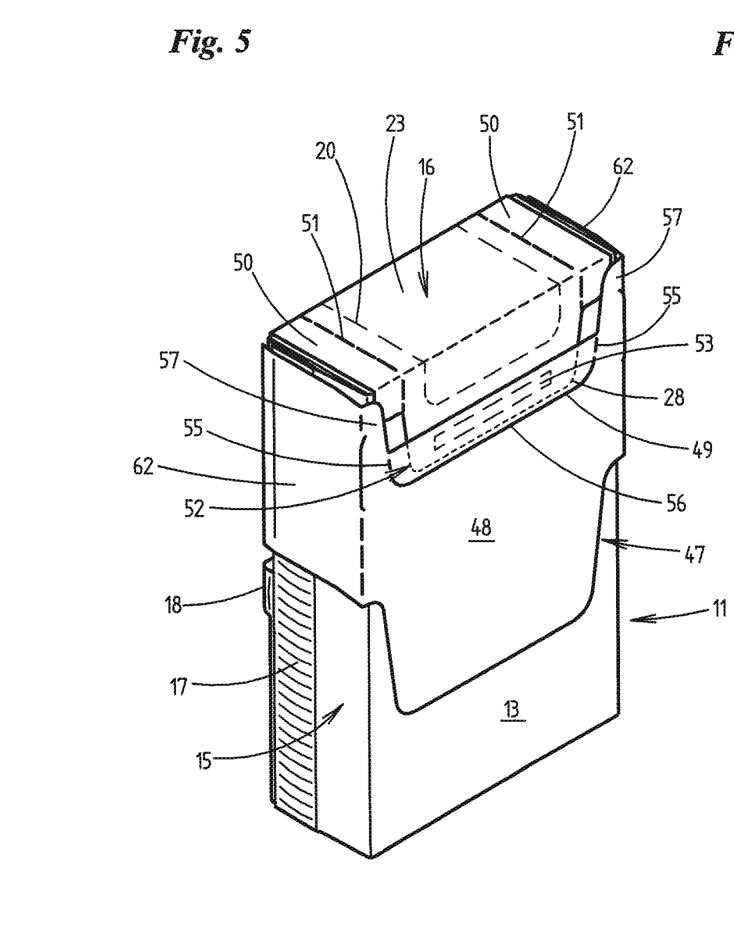
FIG. 5 shows another embodiment of an inner pack or sealed pack in a perspective illustration.
Figure 7:
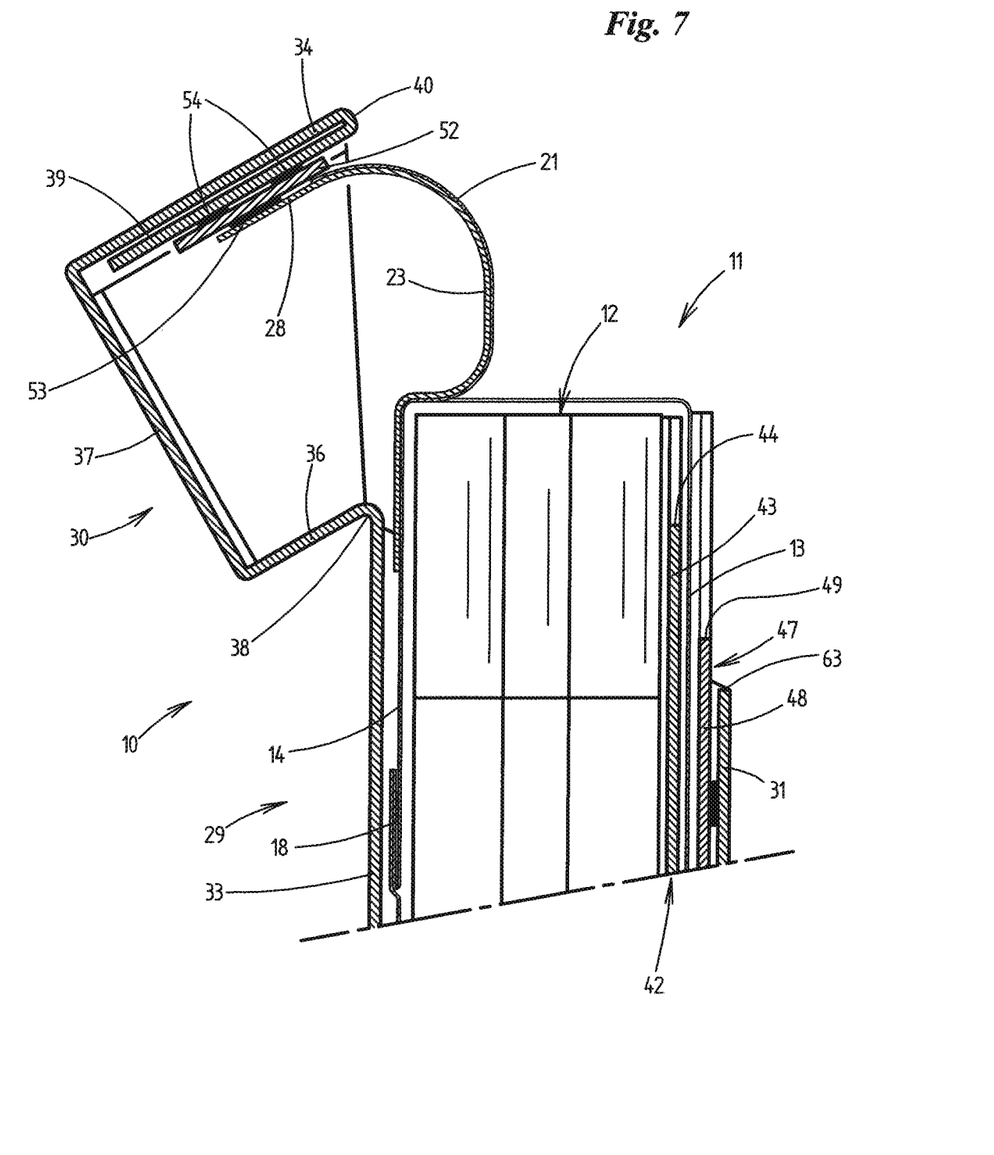
FIG. 7 shows a vertical partial section VII-VII of FIG. 6 on an enlarged scale.

The pack according to FIG. 5 to FIG. 7 is formed substantially corresponding to the previously described exemplary embodiment in respect of the outer pack 10 and the inner pack 11. The collar 47 of the outer pack 10 is used in respect of the connection of the closure label 23 or of the actuating tab 28 to the lid 30 of the outer pack 10. In the region of the preferably conventionally configured recess 49 of the collar front wall 48 there is a connecting piece 52 for securing the actuating tab 48 (on the inner side) and for connecting same to the lid 30 or to the inner side of the lid front wall 34.

The connecting piece 52 can be connected as a separate component piece to the closure label 23, in particular to the actuating tab 28, by means of a region of glue 41 or glue strip 53. In the present example, said actuating tab is not folded, but rather lies with the (otherwise glue-free) outer side against the connecting piece 52 or is connected thereto. During the production of the pack, in particular during the final folding of the lid front wall 32, the connecting piece 52 is preferably connected to said lid front wall likewise via glue, in the present case via two glue strips 54. The connection to the inner side of the lid inner flap 39 also takes place here. The connecting piece 52 acts here as a distance compensating means between lid 30 or lid inner flap 39, on the one hand, and actuating tab 28 of the closure label 23, on the other hand.

The connecting piece 52 is preferably (originally) connected to the blank of the collar 47, specifically with the collar front wall 48 in the region of the recess 49. The connecting piece 52 is designed as a strip which is adapted to the contour of the recess 49. The connection to the collar 47 is designed in such a manner that easy severing is possible, namely when the lid 30 is opened for the first time. The connecting piece 52 is connected to the collar 47 via residual connections 55 bounded by punched portions. In the present case, a continuous punched line 56 is arranged in the region of a transversely directed edge of the recess 49 in a manner corresponding to the contour of the latter. The residual connections 55 which ensure that the connecting piece 52 is joined to the collar 47 until the pack is completed, but secondly open up the recess 49, which is formed in a customary manner, when the lid 30 is opened are located only in the region of upright limbs, namely in the region of webs 57 of the collar 47. The connecting piece 52 remains permanently connected to the inner side of the lid front wall 34 (FIG. 7).

Figure 8:
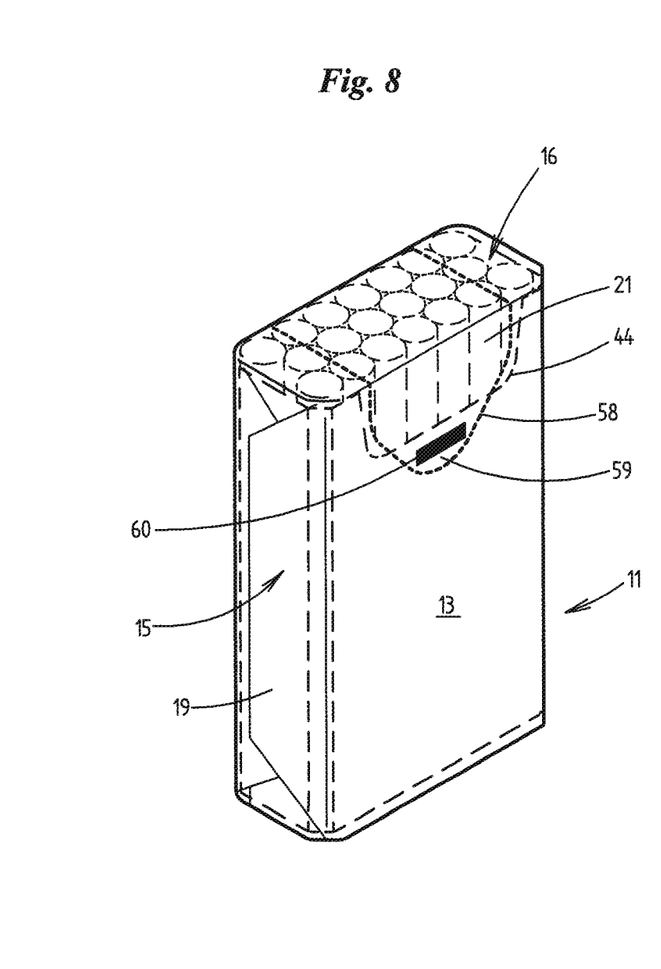
FIG. 8 shows a third embodiment of an inner pack or sealed pack in a perspective illustration.
Figure 9:
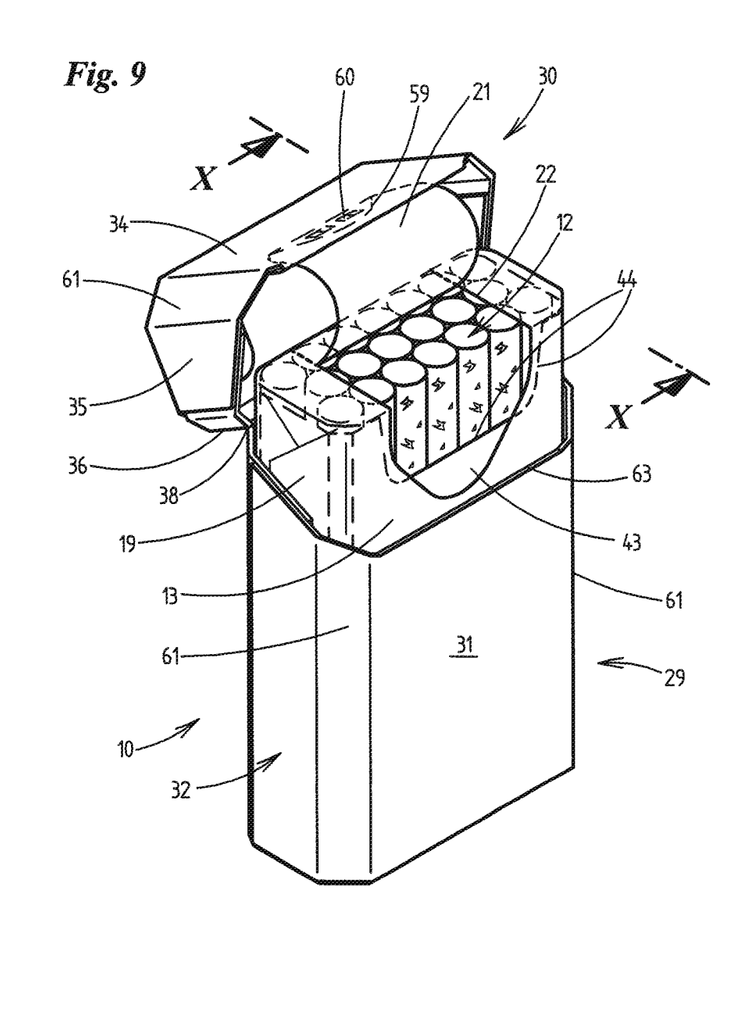
FIG. 9 shows a cigarette pack in an illustration analogous to FIG. 2 and FIG. 6 with an inner pack according to FIG. 8.
Figure 10:
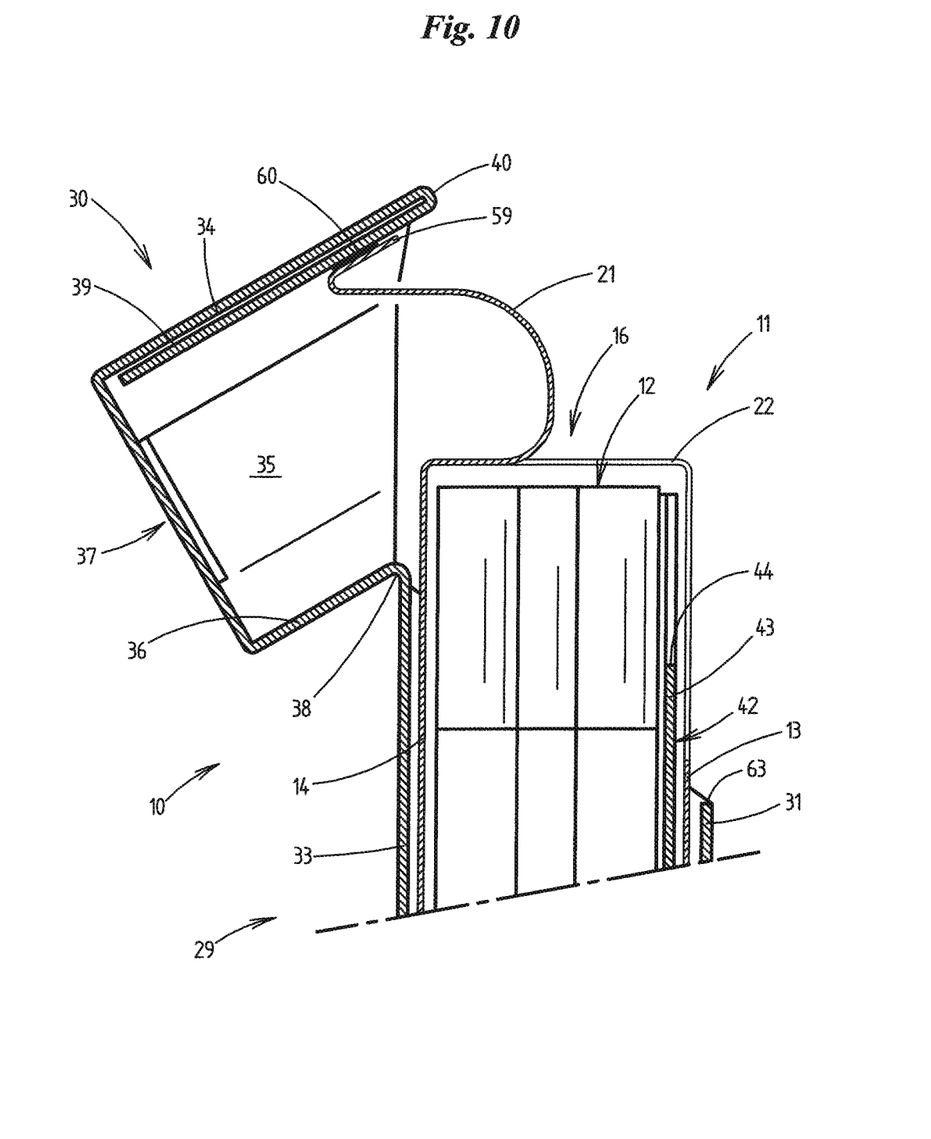
FIG. 10 shows a vertical partial section X-X of FIG. 9 on an enlarged scale.

A special (cigarette) pack with automatic opening of a (sealed) inner pack 11 is shown in FIG. 8 to FIG. 10. The outer pack 10 is a simplified version of a hinge lid box or hinge lid pack, specifically without the otherwise customary collar. The inner pack 11 is preferably provided with an inner collar 42.

The inner pack 11 has an opening tab 21 which is bounded by a line of weakness 58. The latter is preferably designed in such a manner that, in the case of a multi-layered film of the inner pack 11, only individual layers are provided with punched lines or perforations, but at least one layer of the film remains intact, and therefore the inner pack 11 is also sealed in the region of the opening tab 21 in the original state.

In order to open the inner pack 11, the opening tab 21 is directly grasped and pulled into the opening position. The opening tab 21 is preferably designed, namely contoured, in such a manner that a lower end in the region of the inner front wall 13 can easily be grasped. The end region of the opening tab 21 is shaped here as a tongue 59. The dimensions of the opening tab 21 are expediently selected in such a manner that the tongue 59 or a lower part of same lies in the region of the tray front wall 43 of the inner collar 42, specifically below the recess 44 of the front wall 43.

The opening tab 21 of the inner pack 11 is connected to the lid 30, namely to the lid front wall 34. The latter is preferably conventionally provided with a lid inner flap 39. The opening tab 21 is fastened to the latter, in the present case with a glue strip 60. The latter is attached to the outer side of the inner pack 11 in the region of the opening tab 21, specifically in the region of the tongue 59, preferably below a transversely directed edge of the recess 44 of the inner tray 42.

During the manufacturing of the pack 10, namely during the positioning of the lid 30 with the lid front wall 34 in the closed position, the lid inner flap 39 is located in the immediate vicinity of the inner pack 11, namely of the tongue 59 of the opening tab 21. By means of the contact pressure during the folding operation, the connection to the glue strip 60 applied to the outer side is produced. When the lid 30 is opened (for the first time), the opening tab 21 is detached from the connection with the blank of the inner pack 11. The inner pack 11 is thus opened (FIG. 9). The removal of the cigarettes is facilitated because of the removal opening 22 and the recess 44 of the inner collar 42.

In this embodiment, a covering of the inner side walls 15 of the inner pack 11 is absent in the region above or outside the box part 29. Envelope folding arrangements 19 of the inner pack 11 are therefore advantageously formed in the region of said inner side walls 15, said envelope folding arrangements imparting the image of a customary inner wrapper composed, for example, of silver paper, when the lid is open. The folding flaps of the envelope folding arrangement 19 are preferably connected to one another by thermal sealing.

Furthermore, a special characteristic consists in that the outer pack 10 of this pack embodiment is provided with beveled, upright pack edges, i.e. oblique edges 61, specifically continuously in the region of box part 29 and lid 30. The pack is therefore designed as an eight-angled or octagonal pack. The inner collar 42 is also adapted to this contour of the outer pack 10.

Figure 11:
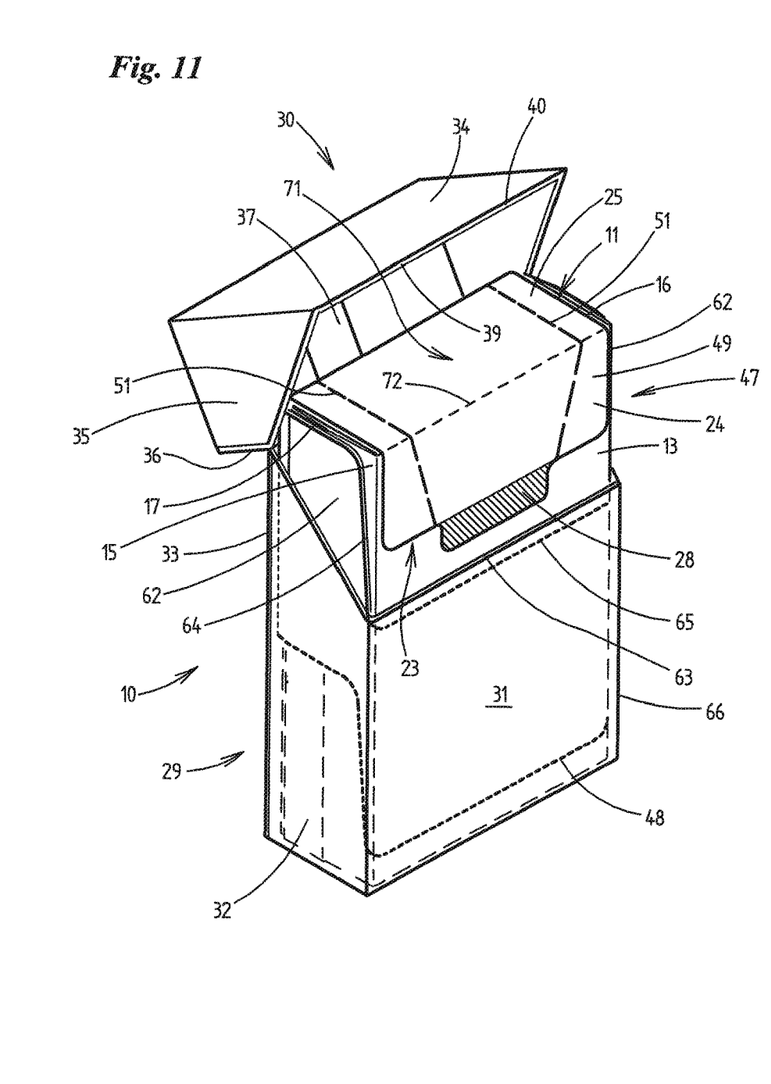
FIG. 11 shows a further embodiment of a pack with an open lid in a perspective illustration.
Figure 12:
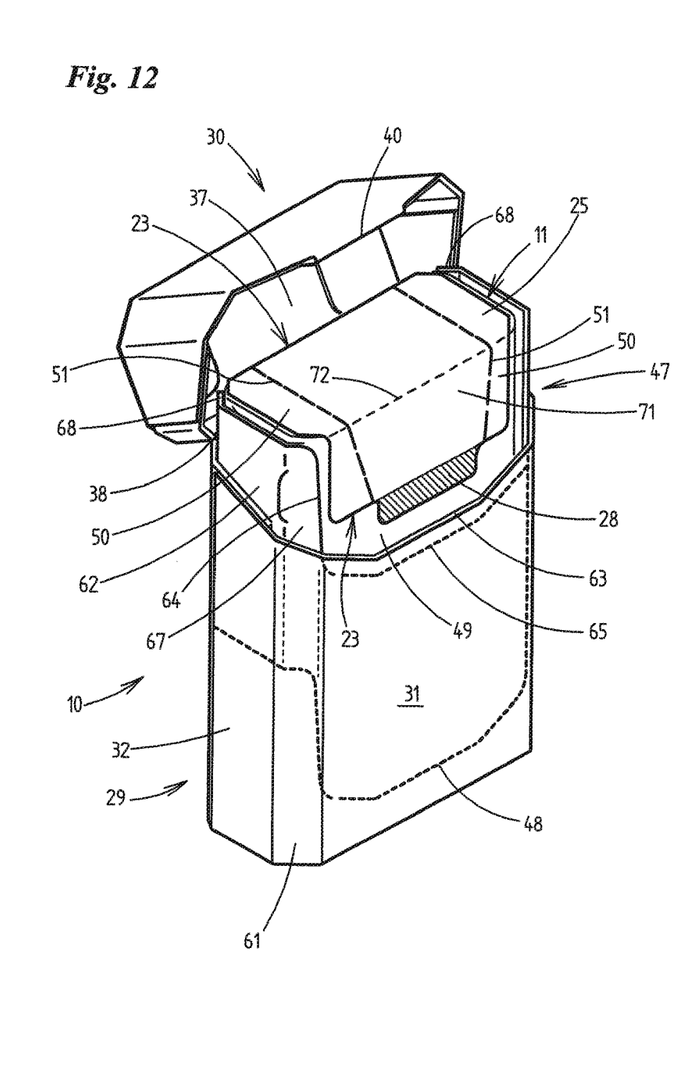
FIG. 12 shows an illustration of a pack analogous to FIG. 11 for an embodiment with oblique edges (octagonal pack)
Figure 13:
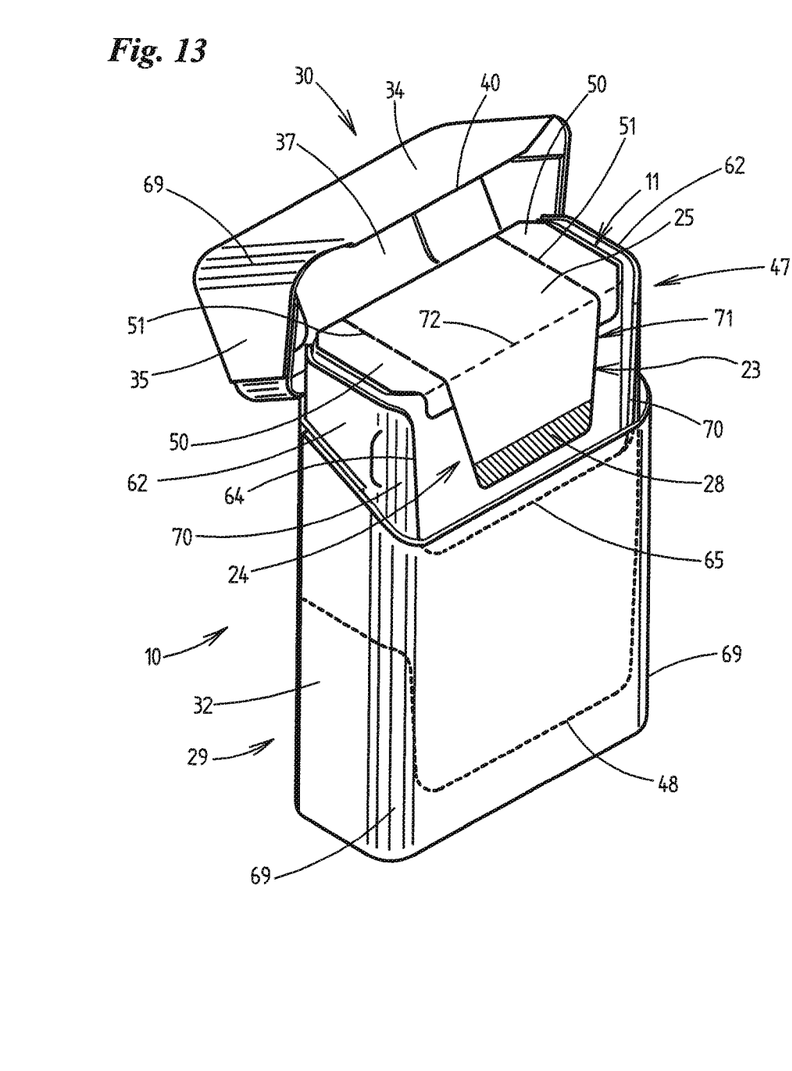
FIG. 13 shows an illustration corresponding to FIG. 12 for an outer pack with round edges.

A special characteristic of the packs according to FIG. 11 to FIG. 13 consists in that measures for an easier, precise attachment of the closure label 23 and for easier handling by the user are implemented. The closure label 23 can be designed in any manner, even as a strip-shaped blank. In the pack examples shown, particularly configured closure labels 23 are used.

A special design relates to the configuration of the collar 47 of the outer pack 10, which is designed as a hinge lid box. The recess 49 bounded by the collar front wall 48 and the collar side flaps 42 is enlarged or widened, specifically in such a manner that it extends (approximately) over the full width of the front side of the pack, i.e. over the full width of the collar front wall 48. As a result, the upper, end-side region of the inner pack 11 is exposed, in particular as far as an upper boundary edge or transversely directed closing edge 63 of the box part 29, namely of the box front wall 31. As a result, an extensive region is available for the attachment, but also for the handling, of the closure label 23.

In the exemplary embodiment of FIG. 11, the full free area of the inner pack 11 or of the inner front wall 13 above the box front wall 31 is kept free by means of the corresponding recess 49 of the collar front wall 48. When the lid 30 is open, only the collar side flaps 62 in the region of the lid side walls 35 are visible. Said collar side flaps are designed in a particular manner, namely with an obliquely lying flap edge 64 which is slightly set back from the cuboidal inner pack 11. The collar side flaps 62 are accordingly formed in the upper region with a converging transverse profile and with a rounded portion in the transition to the horizontal upper edge. The stability of the pack also with respect to the closed position of the lid 30 is preferably ensured by a correspondingly designed supporting member within the inner pack, in particular by an inner collar.

In this exemplary embodiment, the collar 47 is provided with a lower boundary of the recess 49 which runs as a transversely directed, preferably rectilinear collar edge 65 level with the closing edge 63 or—as shown—below same. The collar front wall 48 extends virtually into the region of a bottom wall of the outer pack, in a manner matching the size and contour of the recess 49. In the present case, the outer pack is of exactly cuboidal design, i.e. with pack edges 66 which are right-angled in cross section and are upright.

FIG. 12 relates to an exemplary embodiment which is advantageously formed with oblique edges 61—analogously to FIG. 9—in the case of a hinge lid box as the outer pack 10. The collar 47 is adapted to this pack contour, wherein the collar side flaps 62 have oblique limbs 67 in the region of the front-side oblique edges 61, which oblique limbs are directed at an obtuse angle in relation to the collar side flaps 62, in a manner corresponding to the shape of the oblique edges 61. Accordingly, in this embodiment, the recess 49 is bounded by the oblique limbs 67 or by the flap edge 64 thereof which is preferably directed obliquely, with a width converging toward the lid end wall 37. In the case of this pack form, a rear-side flap limb 68 is preferably also arranged in the region of rear-side oblique edges 61 on the collar side flaps 62.

The collar edge 65 preferably lies below the closing edge 63 also in this exemplary embodiment. The two edges 63 and 65—preferably running in parallel—are formed in the manner of a polygon, in each case with edge portions directed at an obtuse angle to one another and directed upward to the side walls 32.

FIG. 13 shows a pack which is designed analogously to FIG. 12 and in which the upright pack edges are designed as round edges 69, specifically coordinated to the size of cigarettes. The round edges 69 also extend in the region of the lid 30, preferably on the front side and on the rear side.

The collar 47 is adapted to said pack configuration. The recess 49 is bounded laterally by round limbs 70 which surround the inner pack 11 in this region. The round limbs 70 which are present on both sides are bounded by flap edges 64 which are preferably directed obliquely analogously to FIG. 12, forming a width of the recess 49 that diverges toward the end side. A transversely directed collar edge 64 for bounding the recess 49 preferably extends at a small distance below the likewise transversely directed closing edge 63 of the box part 29. The two edges 63, 65 are preferably arranged rectilinearly and parallel to each other.

Figure 14:
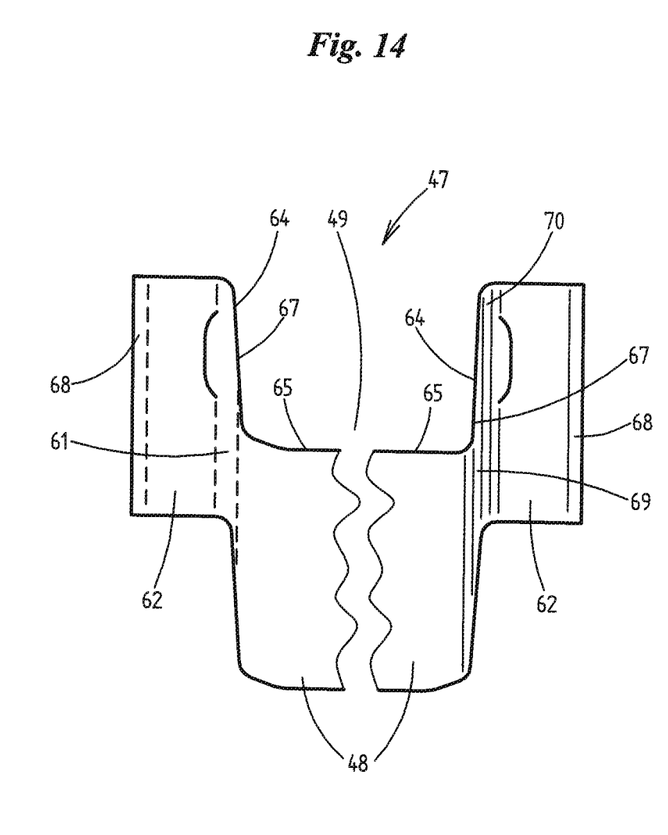
FIG. 14 shows a spread-out blank for a collar of the outer pack.

FIG. 14 shows a spread-out blank for a collar 47, specifically in the left half in the embodiment for a hinge lid box with oblique edges 61, and in the right half in the embodiment for hinge lid boxes with round edges 69.

The closure labels 23 used in these packs can be designed in any manner, even as strip-shaped blanks, preferably forming a front limb 24, end portion 25 and rear-side anchoring limb 26.

The closure labels 23 according to FIG. 11 and FIG. 12 are a special characteristic. The closure labels 23 extend (approximately) over the full width of the inner pack 11, wherein the inner end wall 16 is preferably covered over the full surface area, as is an upper region of the inner front wall 13 adjacent to the inner end wall 16. In the example according to FIG. 5, the end portion 25 is adapted on the end side or edge side to the contour of the outer pack (10) (octagonal pack) by oblique portions. The front limb 24 is formed with a slightly reduced width, with a small distance being kept from the flap edges 64. The (adhesive-free) actuating tab (28) which can be grasped here preferably by hand is located in the region of a rear transverse edge.

The closure labels 23 can be moved with full width into the opening or closed position. In the exemplary embodiments shown here, a main strip 71 of the closure label 23 is grasped and severed from the lateral retaining strips 50. In the examples here, the retaining strips 50 can be severed from the retaining strips 50 by the perforation lines 51 when the closure label 23 is opened (for the first time). The perforation lines 51 preferably extend at least in the region of the limbs 24 and 25 of the closure label 23.

In the special closure labels 23 according to FIG. 11 and FIG. 12, the perforation lines 51 run in a diverging manner—starting from the actuating tab 28—and therefore the main strip 71, at least in the region of the inner end wall 16, has a greater width than the actuating tab 28. In this exemplary embodiment, the retaining strips 50 extend over the entire length of the closure label.

A further special characteristic consists in that transversely directed folding lines 72 in preferably all of the embodiments of the closure label 23 are designed as a line of weakness of the label material (film), wherein perforation sections are formed in a partial cross section of the film, at any rate with an inner sealed position of the multi-layered film being maintained. As a result, the folding is facilitated without having an adverse effect on the significance of the closure label 23.

In these exemplary embodiments, the inner pack 11 is preferably designed in the manner described in conjunction with FIG. 1 to FIG. 10, i.e. in particular with an inner collar 42. Furthermore, the (extensive) closure labels 23 can be used in the embodiment according to FIG. 11 and FIG. 12, and also in the case of the packs of FIG. 1 to FIG. 7.

Further special characteristics in respect of the design of (cigarette) packs with an outer pack 10 in the embodiment as a hinge lid box/hinge lid pack and an inner pack 10 preferably as a sealed block are shown in FIG. 15 to FIG. 20.

Figure 15:
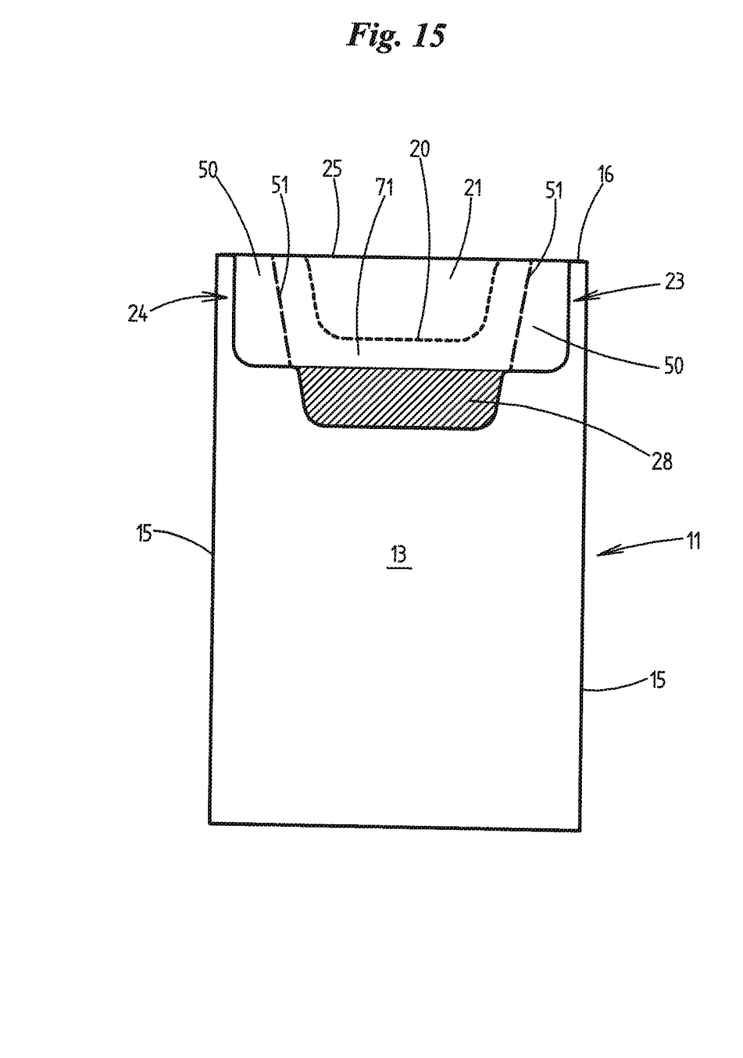
FIG. 15 shows an inner pack, in particular a sealed block, in a front view.
Figure 16:
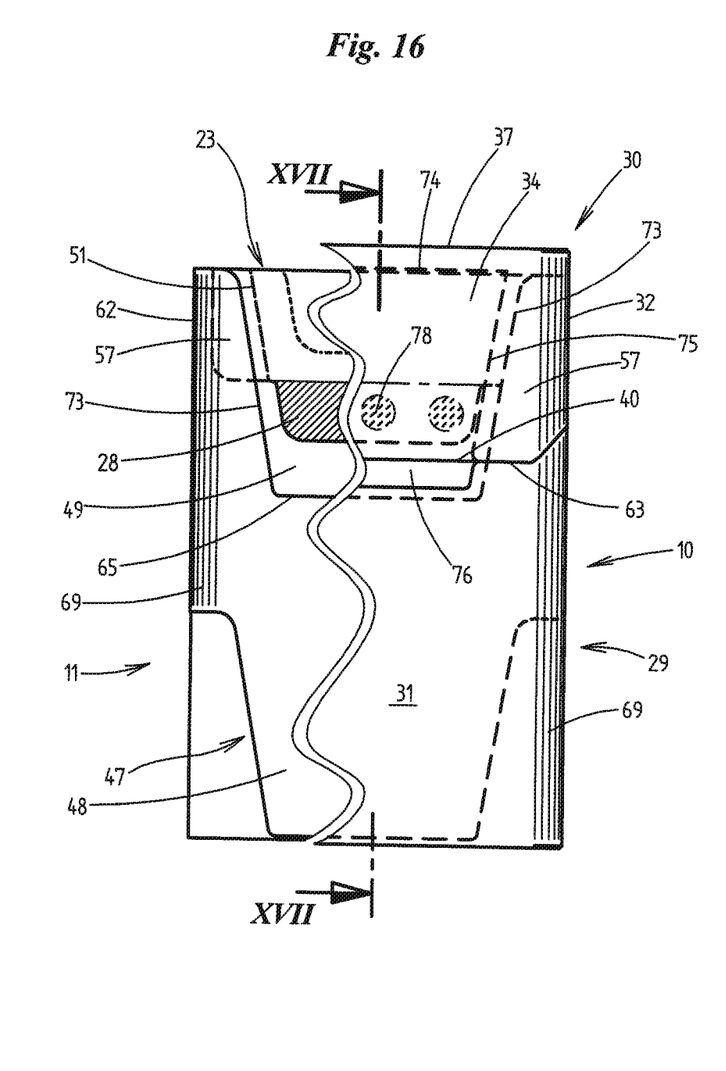
FIG. 16 shows a (cigarette) pack in the embodiment with hinge lid box and a partial view of the inner pack with the collar.
Figure 17:
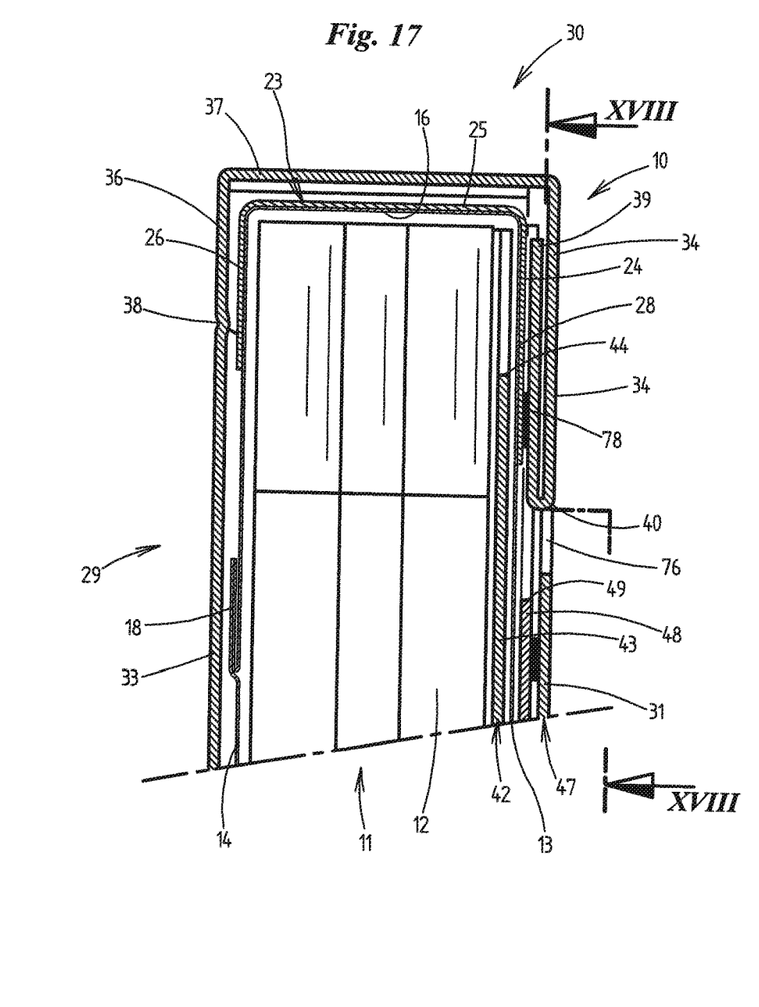
FIG. 17 shows a vertical section through an upper partial region of the pack according to FIG. 16, section plane XVII-XVII, on an enlarged scale.
Figure 18:
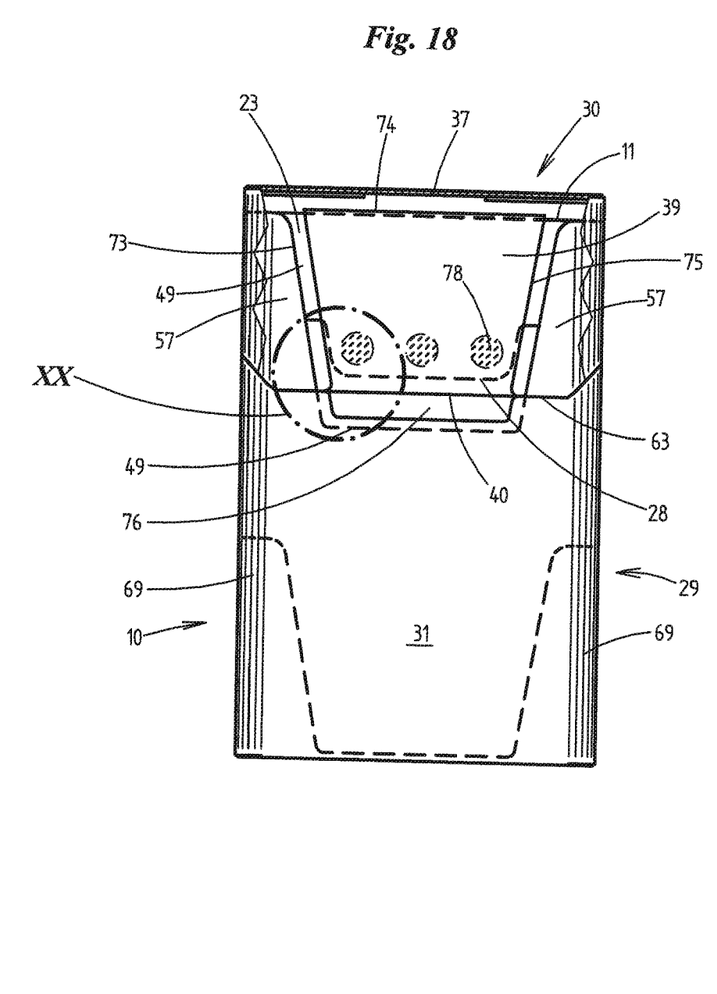
FIG. 18 shows the pack according to FIG. 17 in a front-side view with a vertical section in the lid region corresponding to the visible and section plane XVIII-XVIII.

FIG. 15 is the front view of an inner pack 11 in the embodiment as a sealed block. The closure label 23 which is visible in respect of the front limb 24 corresponds here (approximately) to the embodiment according to FIG. 11 and FIG. 12.

The special characteristic relates primarily to the design of the outer pack 10, in the present case by way of example in the embodiment with round edges 69. The collar 47—which consists of a special blank—is provided with a basically customary recess 49 which is bounded by lateral webs 57 in the region of the front side of the pack (collar front wall 48). The recess 49 and the webs 57 are bounded in this region by obliquely directed web edges 73 which bound a recess 49 diverging to the end side. The recess 49 preferably extends into a region below the closing edge 63 of the box front wall 31. The transversely directed collar edge 65 is rectilinear.

The closure label 23 is arranged at least with the actuating tab 28 in the region of the recess 49 of the collar front wall 48, and can accordingly be grasped, for example by hand—when the lid 30 is open. Furthermore, the perforation lines 51 bounding the main strip 71 of the opening tab 21 extend within the recess 49, preferably parallel to the web edges 73. Accordingly, when the opening tab 21 is actuated—and when the main strip 71 is detached—the lateral regions of the closure label 23, i.e. the retaining strips 50 here, remain predominantly in the region of the webs 57 and are covered by the latter.

The lid inner flap 39 of the outer pack 10 is designed and arranged in particular manner, namely such that, when the lid is closed, the lid inner flap 39 lies (virtually) completely within the recess 49 of the collar front wall 48, i.e. in particular without a mutual overlap. The effect achieved by this is that, when the lid 30 is closed, the lid inner flap 39 lies (approximately) flush with the collar front wall 48 (in particular FIG. 17). This leads to a better closed position of the lid 30.

When a collar 47 is formed with a recess 49 which extends—in width—only over a partial region of the collar front wall 48, the lid inner flap 39 has to be adapted to the recess 49 at least in respect of the size and positioning, and preferably also in respect of the contour. In the case of the—preferably—trapezoidal contour of the recess 49 (FIG. 16, FIG. 18), the lid inner flap 39 is preferably likewise of trapezoidal design (FIG. 19) with an outer edge 74 which is greater or longer than a connecting line of the lid inner flap 39 with the lid front wall 34, i.e. with the lid edge 40, which is formed by folding. The size of the lid inner flap 39 in the longitudinal direction of the blank is preferably selected in such a manner that the (folded) lid inner flap 39 extends approximately over the full size (height) of the lid front wall 34. In the present case, obliquely or convergingly running side edges 75 of the lid inner flap 39 are arranged parallel to the web edges 73 and at a distance therefrom.

Figure 19:
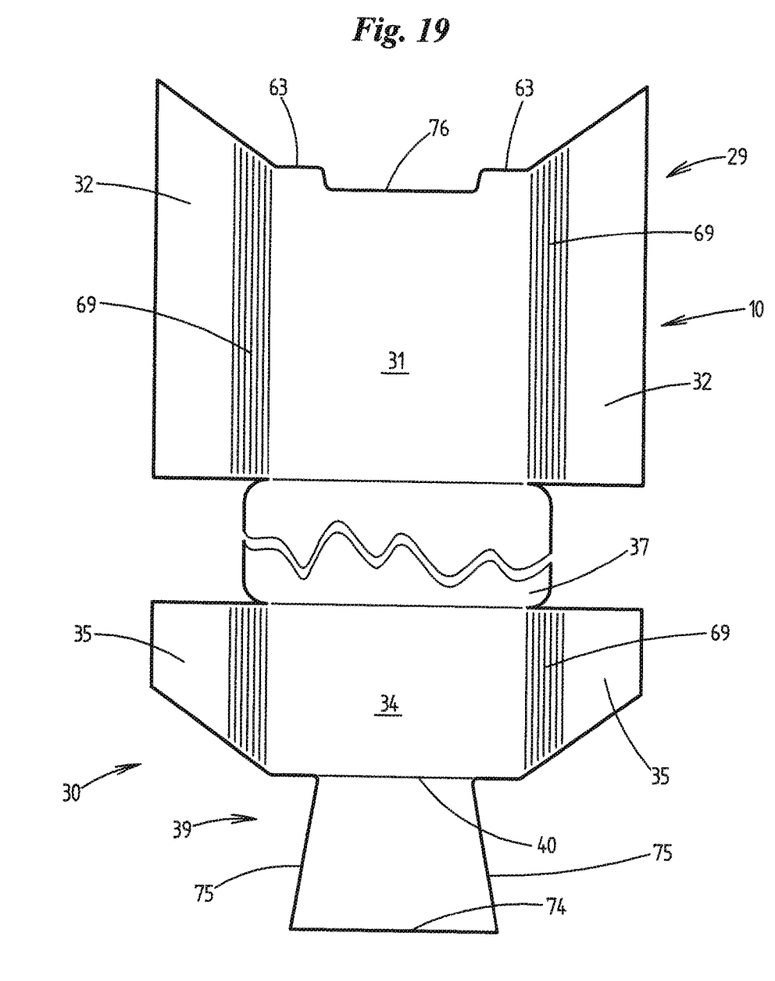
FIG. 19 shows a partial region of a spread-out blank for an (outer) pack according to FIG. 16 to FIG. 18.
Figure 20:
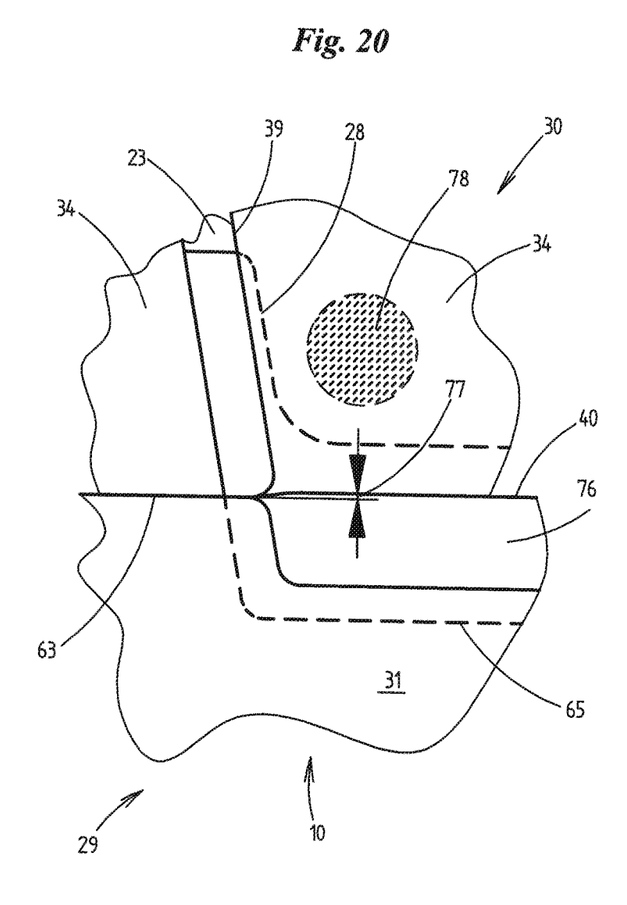
FIG. 20 shows a detail XX in FIG. 18 on an enlarged scale.

As a further special characteristic, a window 76 is formed, preferably centrally, in the region of the closing edge 63. Said window consists of a depression or of a cutout on the free edge of the box front wall 31 (FIG. 19). The window 76 is an interruption of the closing edge 63, i.e. an interruption of the contact of the lid edge 40 against the closing edge 63 of the box part 29. The inner pack 11 or the inner front wall 13 is visible in the region of the window 76. The recess 49 of the collar front wall 48 is preferably dimensioned and/or configured in such a manner that the window 76 lies completely within the region of the recess 49. The size of the window 76 along the closing edge 63 is selected in such a manner that the lid edge 40, i.e. the folding edge of the lid inner flap 39 with the lid front wall 34, substantially corresponds to the size of the window 76 in the transverse direction of the pack. The lid edge 40 which is designed as a folding edge results in a slight offset 77 which remains inconspicuous because of the window 76.

In the present example, the actuating tab 28 is connected to the inner side of the lid front wall 34, in particular to the lid inner flap 39, by adhesive bonding—glue spots 78.

LIST OF REFERENCE NUMBERS

10 Outer pack
11 Inner pack

12 Cigarette group
13 Inner front wall
14 Inner rear wall
15 Inner side wall
16 Inner end wall
17 Side seam
18 Transverse seam
19 Envelope folding arrangement
20 Perforation line
21 Opening tab
22 Receiving opening
23 Closure label
24 Front limb
25 End portion
26 Anchoring limb
27 Edge strip
28 Actuating tab
29 Box part
30 Lid
31 Box front wall
32 Box side wall
33 Box rear wall
34 Lid front wall
35 Lid side wall
36 Lid rear wall
37 Lid end wall
38 Line joint
39 Lid inner flap
40 Lid edge
41 Region of glue
42 Inner collar
43 Tray front wall
44 Recess
45 Projection
46 Mating projection
47 Collar
48 Collar front wall
49 Recess
50 Retaining strip
51 Perforation line
52 Connecting piece
53 Glue strip
54 Glue strip
55 Residual connection
56 Punched line
57 Web
48 Line of weakness
50 Tongue
60 Glue strip
61 Oblique edge
62 Collar side flap
63 Closing edge
64 Flap edge
65 Collar edge
66 Pack edges
67 Oblique limb
68 Flap limb
69 Round edge
70 Round limb
71 Main strip
72 Folding line
73 Web edge
74 Outer edge
75 Side edge
76 Window
77 Offset
78 Glue spots

What is claimed is:

1. A pack, in particular for a cigarette group (12), comprising:
an inner pack (11) produced from film, with a removal opening (22) which is closed by a closure label (23), which is usable repeatedly, with a gripping or actuating tab (28), and with an outer pack (10) in the embodiment as a hinge lid pack, consisting of a box part (29), lid (30) with a lid inner flap (39) folded against the inner side of a lid front wall (34) and with a collar (47), with a collar front wall (48) and collar side flaps (62),
wherein the collar front wall (48) forms a recess (49) which is open toward the lid (13) or toward an inner end wall (16) of the inner pack (11) and in the region of which the closure label (23) is arranged with at least one limb, namely front limb (25), lying against an inner front wall (13) of the inner pack (11),
wherein the recess (49) extends over the full width of the collar front wall (48) in such a manner that the recess (49) is bounded laterally by the collar side flaps (62), and
wherein a transversely directed boundary of the recess (49) of the collar front wall (48), namely transverse edge (65), which faces the box part (29) of the hinge lid pack runs below said closing edge, i.e. concealed by the box front wall (31).

2. The pack as claimed in claim 1, wherein, in an embodiment with front-side, upright pack edges as oblique edges (61) or octagonal edges or as round edges (69), edge strips, in particular oblique limbs (67) or round limbs (70), which are dimensional in accordance with the oblique edges (61) or round edges (69), are arranged on the collar side flaps (62) in order to bound the recess (49) of the collar front wall (48).

* * * * *